United States Patent
Harada et al.

(10) Patent No.: US 8,465,709 B2
(45) Date of Patent: Jun. 18, 2013

(54) IMMERSION OBJECTIVE LENS, RETENTION MECHANISM FOR IMMERSION MEDIUM, AND MANUFACTURING METHOD THEREOF

(75) Inventors: Mitsuo Harada, Hachioji (JP); Akihiro Namba, Tokyo (JP); Morinao Fukuoka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 119 days.

(21) Appl. No.: 12/851,096

(22) Filed: Aug. 5, 2010

(65) Prior Publication Data
US 2010/0315705 A1    Dec. 16, 2010

Related U.S. Application Data

(63) Continuation of application No. 11/505,164, filed on Aug. 16, 2006, which is a continuation of application No. PCT/JP2005/002255, filed on Feb. 15, 2005.

(30) Foreign Application Priority Data

Feb. 16, 2004  (JP) ................ 2004-038500

(51) Int. Cl.
*B01L 3/00*    (2006.01)
(52) U.S. Cl.
USPC .......... 422/547; 422/560; 422/566; 356/244; 356/246
(58) Field of Classification Search
USPC ............ 422/55, 544, 547, 560, 566; 356/244, 356/246
See application file for complete search history.

(56) References Cited

U.S. PATENT DOCUMENTS

| | | | |
|---|---|---|---|
| 3,837,731 A | 9/1974 | Amos et al. | |
| 5,708,531 A | 1/1998 | Yamada et al. | |
| 6,071,748 A | 6/2000 | Modlin et al. | |
| 6,411,434 B1 | 6/2002 | Eastman et al. | |
| 7,961,384 B2 * | 6/2011 | Pirsch ............ | 359/368 |

FOREIGN PATENT DOCUMENTS

| | | |
|---|---|---|
| DE | 221 563 A1 | 4/1985 |
| DE | 202 05 080 U1 | 6/2002 |
| EP | 1 703 312 A1 | 9/2006 |
| JP | 5-60981 | 3/1993 |
| JP | 2003-185926 | 7/2003 |
| JP | 4587960 B2 | 11/2010 |
| WO | WO 02/093232 A2 | 11/2002 |
| WO | WO 2005/078503 A1 | 8/2005 |

OTHER PUBLICATIONS

Extended European Search Report dated Oct. 27, 2010 received in related U.S. Appl. No. 11/505,164.
Neijzen, et al., "Progress in deep-UV Liquid Immersion Mastering of high density Optical Discs", International Symposium on Optical Memory and Optical Data Storage (IEEE), Eindhoven, The Netherlands, Jul. 7, 2002, pp. 299-301, XP010600205.
International Search Repot dated Apr. 19, 2005.

\* cited by examiner

*Primary Examiner* — Jill Warden
*Assistant Examiner* — Dwayne K Handy
(74) *Attorney, Agent, or Firm* — Scully, Scott, Murphy & Presser, P.C.

(57) ABSTRACT

There is provided a retention mechanism for an immersion medium, for use in a device which observes/measures a sample by use of an immersion objective lens, includes a member which retains the immersion medium near a tip portion of the objective lens, wherein the member is configured to include at least first and second materials.

20 Claims, 7 Drawing Sheets

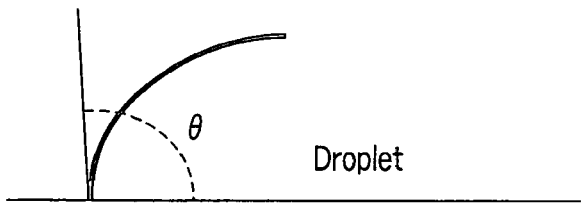
F I G. 5A  Low affinity (large contact angle)
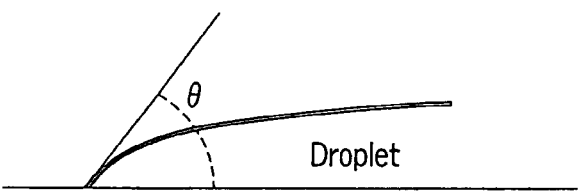
F I G. 5B  High affinity (small contact angle)
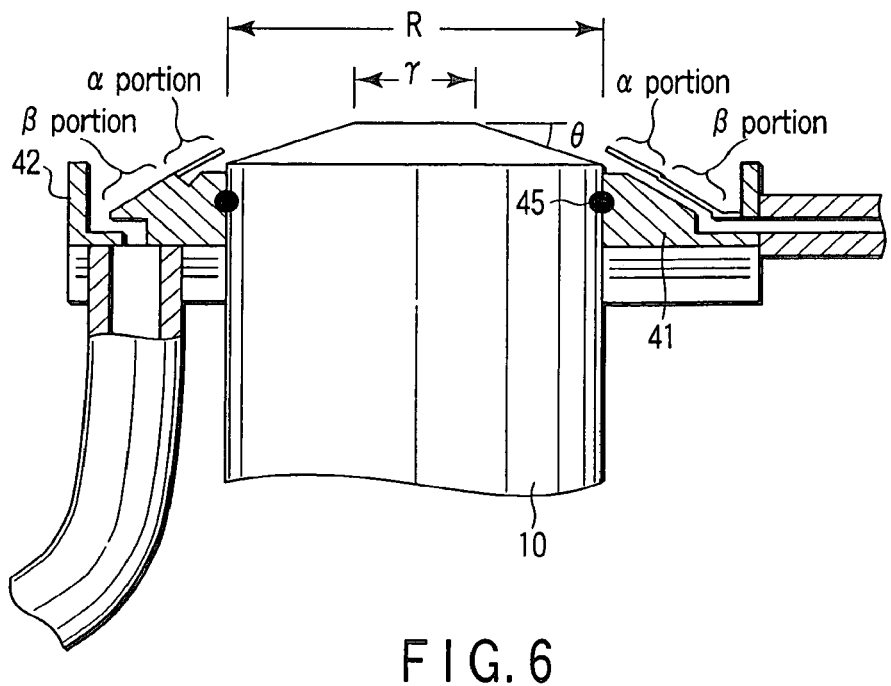
F I G. 6

# IMMERSION OBJECTIVE LENS, RETENTION MECHANISM FOR IMMERSION MEDIUM, AND MANUFACTURING METHOD THEREOF

CROSS-REFERENCE TO RELATED APPLICATIONS

This is a Continuation Application of U.S. Ser. No. 11/505,164, filed Aug. 16, 2006, which is a Continuation Application of PCT Application No. PCT/JP2005/002255, filed Feb. 15, 2005, which was published under PCT Article 21 (2) in Japanese, the entire contents of each of which are incorporated herein by reference.

This application is based upon and claims the benefit of priority from prior Japanese Patent Application No. 2004-038500, filed Feb. 16, 2004, the entire contents of which is incorporated herein by reference.

BACKGROUND OF THE INVENTION

1. Field of the Invention

The present invention relates to an immersion objective lens in a device which monitors and measures a sample with use of the immersion objective lens, a retention mechanism for holding an immersion medium, and a manufacturing method thereof.

2. Description of the Related Art

When a sample in a micro-plate set on a sample stage is observed or measured by use of an immersion objective lens, an immersion medium is supplied to the tip of the objective lens, and the sample is observed and measured through the immersion medium and the bottom glass of the micro-plate. Water or immersion oil is used as this immersion medium.

The specification of U.S. Pat. No. 6,071,748 discloses a technique concerning a fluorescence correlation microscopy apparatus. In this apparatus, light is irradiated on a sample through an immersion objective lens from the lower surface of a micro-plate, and fluorescence from the sample is detected. Meanwhile, the micro-plate has many wells to contain samples, provided at positions spatially apart from one another. Therefore, measurement using a micro-plate involves a wide observation range and a long distance movement in the horizontal direction. Therefore, as a measurement area shifts, an immersion medium at the tip portion of the lens sticks to the bottom plate of the micro-plate and is scattered, in some cases. If measurement takes a long time, drying is accelerated and the immersion medium is lost since a strong laser beam runs through the objective lens for a long time, in other cases.

Hence, the pamphlet of International Publication No. WO 02/093232 discloses a device for supplying an immersion medium which supplies a large amount of immersion medium.

BRIEF SUMMARY OF THE INVENTION

A retention mechanism for an immersion medium, for use in a device which observes/measures a sample by use of an immersion objective lens, according to a first aspect of the present invention includes: a member which retains the immersion medium near a tip portion of the objective lens, wherein the member is configured to include at least first and second materials.

An immersion objective lens according to a second aspect of the present invention includes: a lens ring portion which has at least a part having a low affinity with an immersion medium.

A method of manufacturing a retention mechanism for an immersion medium, for use in a device which observes/measures a sample by use of an immersion objective lens, according to a third aspect of the present invention includes: manufacturing by locating a material having a high or low affinity with the immersion medium at a member which retains the immersion medium, or by performing a surface treatment on a material having a high or low affinity with the immersion medium.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5A is a view schematically showing a contact angle between a substrate and an immersion medium;

FIG. 5B is also a view schematically showing a contact angle between a substrate and an immersion medium;

FIG. 6 is a cross-sectional view of a liquid pool plate;

DETAILED DESCRIPTION OF THE INVENTION

[First Embodiment]

Figure 1:
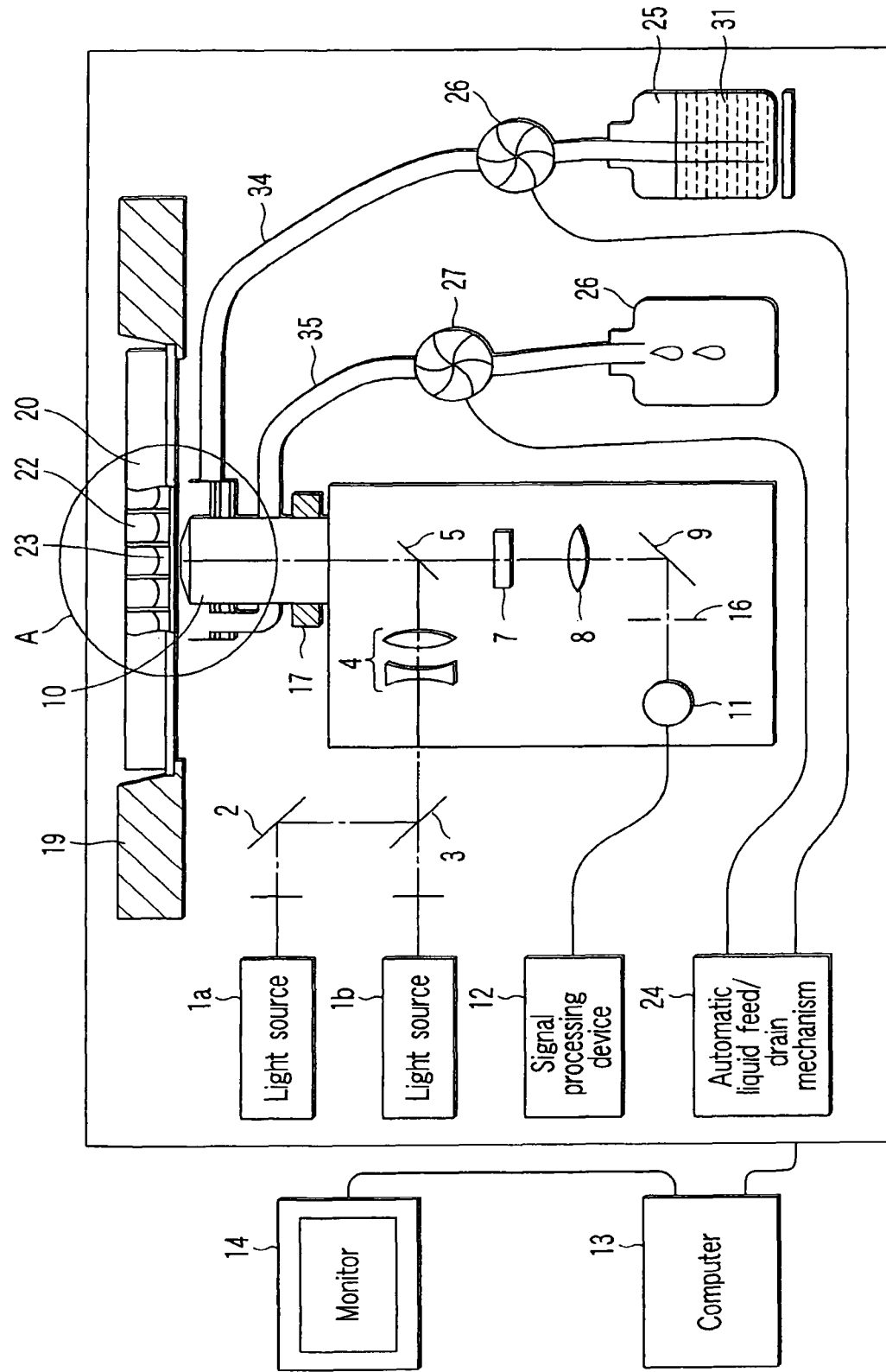
FIG. 1 is a diagram showing the structure of an observation/measurement device to which a retention mechanism for an immersion medium according to the first embodiment of the present invention is applied.

FIG. 1 is a view showing the structure of an observation/measurement apparatus to which an immersion medium retention mechanism according to the first embodiment of the present invention is applied. The fundamental apparatus structure of this observation/measurement apparatus is based on an inverted microscope. For example, the structure and`} operation of the apparatus applied to, for example, a confocal optical microscope will now be described with reference to FIG. 1.

The present observation/measurement apparatus is provided with two kinds of light sources 1a and 1b. For the light source 1a, a helium neon laser (having an output power of 2 mW and a wavelength of 633 nm) is used. For the light source 1b, an argon-ion laser (having an output power of 10 mW and a wavelength of 488 nm) is used.

The traveling direction of a light beam emitted from the light source 1a is changed by a mirror 2, and is further synthesized with another beam emitted from the light source 1b by a dichroic mirror 3, to be unified into one light path. The one light beam thus synthesized becomes a collimated beam whose beam diameter is enhanced by a lens 4. The collimated beam is reflected by another dichroic mirror 5 and reaches an objective lens 10.

The dichroic mirror 5 is manufactured in a manner that one side of a glass-made flat plate is subjected to multi-layer film coating, to optimize spectral characteristics of transparency and reflection. A cube beam splitter is used as the dichroic mirror 5.

On an XY stage 19, a micro-plate 20 holding samples is fixed and set. The position of the micro-plate 20 in a horizontal plane is adjusted by the XY stage 19, and the position of the objective lens 10 in the vertical direction is adjusted by a Z-axis adjustment mechanism 17. Thus, the samples as targets to measure are adjusted to be positioned in an area where the objective lens 10 converges light (the area is called a confocal area).

The micro-plate 20 has 96 wells 22 (circular grooves to contain samples). The bottom face of each well 22 is formed, as a window, of a material such as glass which allows visible light to pass. Light emitted from the objective lens 10 opposed thereto below the micro-plate 20 penetrates this window and converges inside a sample.

Used as the objective lens 10 is, for example, a X40 water immersion objective lens (NA 0.9). Therefore, water as an immersion medium is filled between the bottom face of the micro-plate 20 (e.g., the bottom face of the wells 22) and the tip portion of the objective lens 10. The size and shape of the confocal area which the light emitted form light sources forms in a well 22 has a substantially cylindrical shape having a diameter of about 0.6 μm and a length of 2 μm. The convergence position of the laser beam is substantially the center part of the well 22 in the horizontal direction (X-Y axis), and is 100 μm above the position of the upper wall of the bottom face of the well 22.

The laser beam converged by the objective lens 10 excites a fluorescent material in samples, and the fluorescent substance emits fluorescence. Various fluorescent pigments may be used as the fluorescent substance. For example, when rhodamine green (RhG) is used, a peak absorption wavelength of rhodamine green is near 490 nm, and a peak light emission wavelength thereof is near 530 nm. Hence, rhodamine green is excited by an argon laser. Alternatively, when Cy5 is used as the fluorescent substance, this substance is excited by a helium neon laser. Cy5 has a peak absorption wavelength near 640 nm and a peak light emission wavelength near 670 nm.

The fluorescence passes through the objective lens 10 again and subsequently through the dichroic mirror 5, and enters into a barrier filter 7. The barrier filter 7 has a disk-like shape. The transparency characteristic of the barrier filter 7 is adjusted so as to allow only the light within a wavelength range of a fluorescent light emission spectrum to pass. As a result, a part of the laser beam scatters within a sample container or is reflected by the wall of the well 22, so that noise light returning to an incident path can be cut. That is, the wavelength of fluorescence and the wavelength of background light are different from each other.

Signal light which has passed through the barrier filter 7 passes through a lens 8, forming converged light, which is reflected by a mirror 9. The light is then converged on a pinhole plane of a pinhole 16 provided in the rear side. That is, the focal plane of the lens 8 and the open face of the pinhole 16 agree with each other. The pinhole 16 has a diameter of 50 μm. Background light from the other area than the confocal area of light which is formed in the well 22 is removed by the pinhole 16.

A light detector 11 is located near and in the rear side of the pinhole 16. Signal light received by the light detector 11 is low light level and forms a photon pulse. Hence, a faint light detector such as an avalanche photodiode (APD) or an photoelectron multiplier tube is used as the light detector 11.

The light detector 11 converts the signal light into an electric signal (current pulse) and inputs the signal to a signal processing device 12. In the signal processing device 12, the electric signal is amplified and subjected to waveform shaping, thereby to form an on-off voltage pulse which is guided to a computer 13. The on-off voltage pulse is stored into a memory (not shown) of the computer 13. Based on this data, calculation such as correlation analysis is carried out. Further, fluorescent intensity, fluorescent lifetime, an autocorrelation function of intensity fluctuation of obtained fluorescence, or analysis result such as a cross-correlation function are displayed on a monitor 14 of the computer 13.

Figure 2:
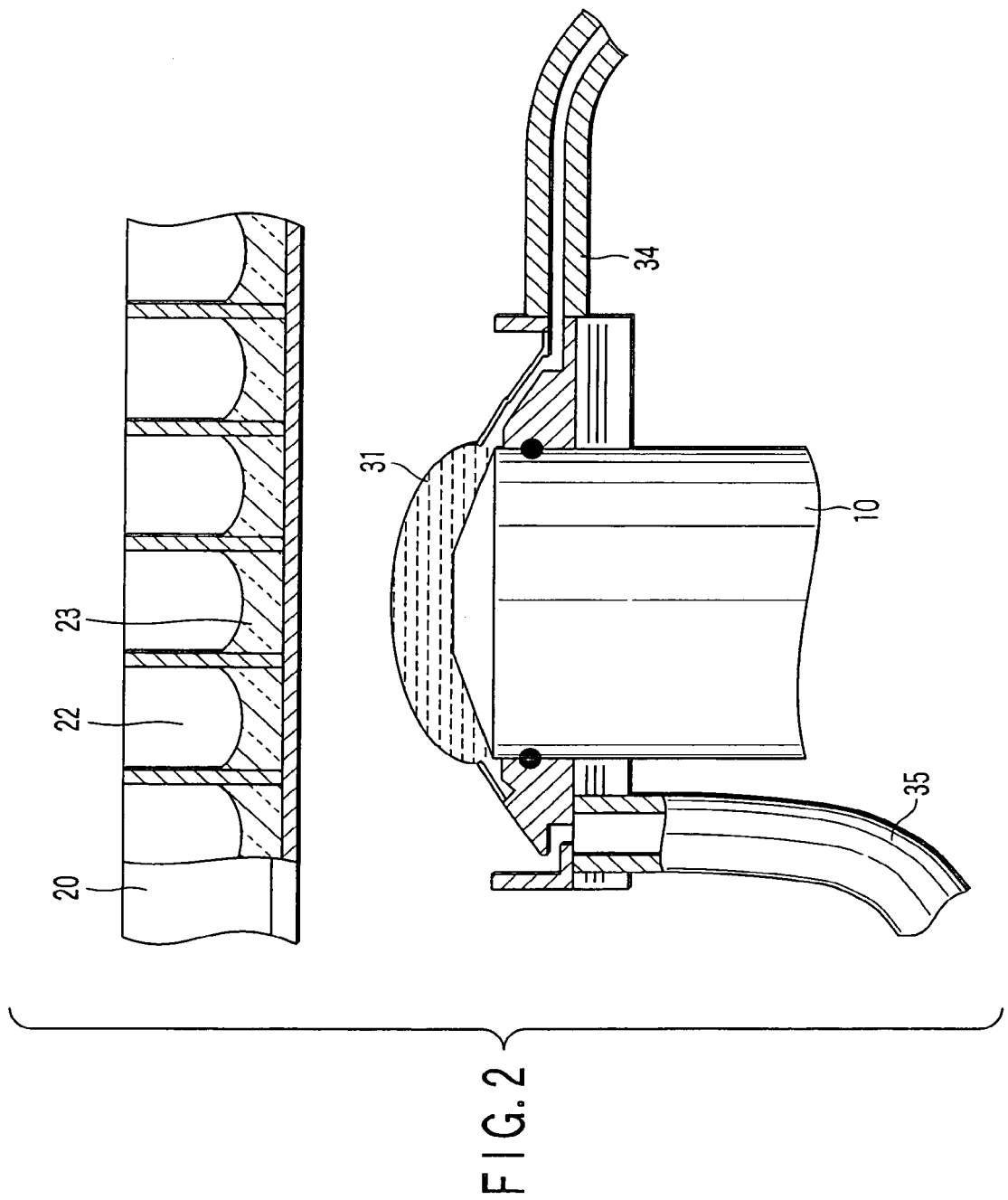
FIG. 2 is an enlarged cross-sectional view showing a tip portion of an objective lens and a part of a micro-plate.

FIG. 2 is an enlarged view of the part A shown in FIG. 1, e.g., an enlarged cross-sectional view showing the tip portion of the objective lens 10 and a part of the micro-plate 20.

As described in FIG. 1, the micro-plate 20 is set on the XY stage 19 (not shown). The objective lens 10 is provided up side down, facing the bottom face of the micro-plate 20. Samples 23 are contained in wells 22 recessed in the micro-plate 20. In size the micro-plate 20 is 127 mm wide, 85.5 mm long, and 14.5 mm high. In the case of 96 circular wells which are frequently used, the groove has a diameter of 6.6 mm and a depth of 12.5 mm.

An immersion medium 31 (for example, immersion water) is filled between the tip portion of the objective lens 10 and the bottom face of the micro-plate 20. The bottom faces of the wells 22 of the micro-plate 20 are made of optically transparent material such as glass or acrylic resins. Light which has passed through the objective lens 10 enters into the samples contained in the wells 22, not having hardly attenuated through the immersion medium 31.

In the case of observing/measuring samples using the micro-plate 20 as a container, normally, samples are contained in a lot of wells 22. Each of the samples is separately measured or observed. Therefore, measurement needs to be sequentially carried out repeatedly, while operating the XY stage 19 in the XY plane to adjust finely the micro-plate 20. Since the micro-plate 20 is repeatedly moved above the objective lens 10 of which tip portion is filled with the immersion medium 31, the immersion medium 31 formed on the tip portion of the objective lens 10 scatters as the micro-plate 20 moves. If measurement takes a long time, thermal energy of the light is transferred to the immersion medium 31 because the light passes through the objective lens 10. This causes evaporation of the immersion medium 31. Therefore, a sufficient amount of immersion medium needs to be filled between the tip portion of the objective lens 10 and the bottom face of the micro-plate 20.

As described in an example, the immersion medium 31 is not limited to water (immersion water) but oil may be used.

Figure 3:
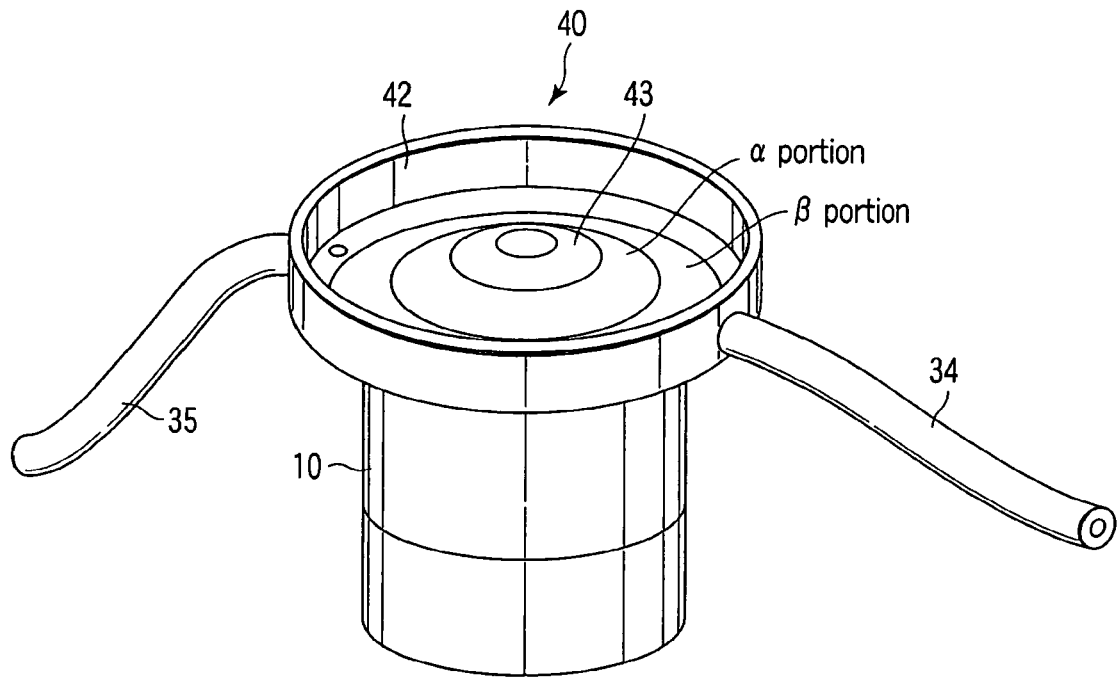
FIG. 3 is a perspective view showing the retention mechanism for an immersion medium, according to the first embodiment.
Figure 4:
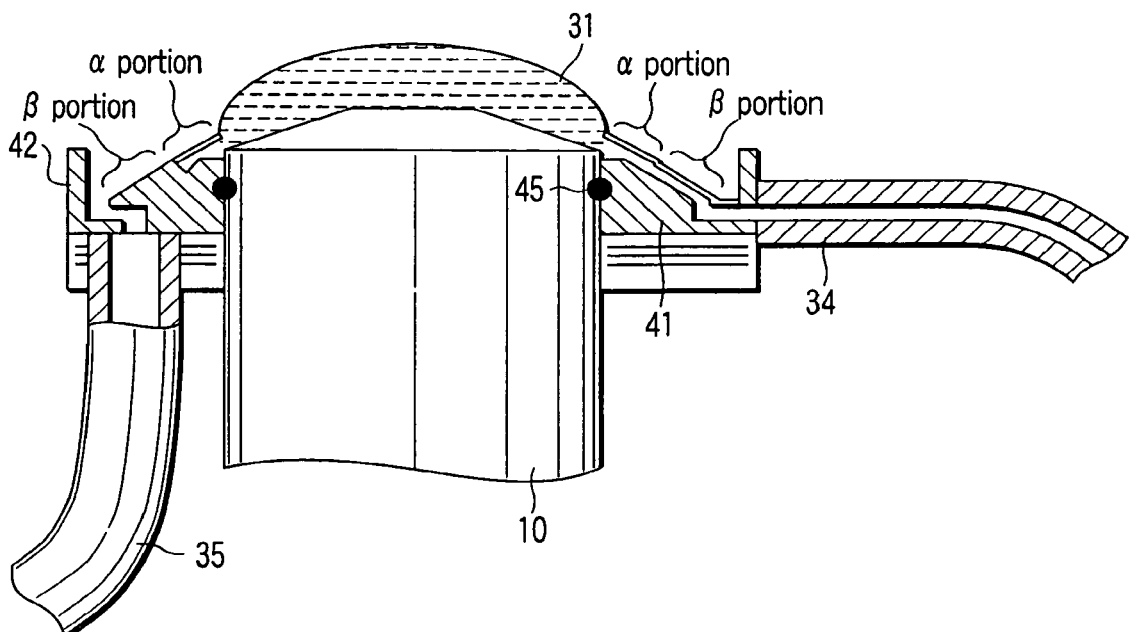
FIG. 4 is a longitudinal cross-sectional view of the retention mechanism for an immersion medium, according to the first embodiment.

FIG. 3 is a perspective view showing a retention mechanism for an immersion medium, according to the first embodiment. FIG. 4 is a longitudinal cross-sectional view of the retention mechanism for an immersion medium, according to the first embodiment. Referring to FIGS. 3 and 4, the retention mechanism for the immersion medium will be described. In this embodiment, as shown in FIG. 4, the immersion medium retention mechanism is constituted by a hollow bottom plate 41 attached to be engaged in the periphery of the objective lens 10, and a wall 42 put around the bottom plate 41. Further, on the surface of the bottom plate 41, an α portion which is subjected to a water repellent treatment against the immersion medium 31 and a β portion which is subjected to water affinity treatment are provided. This retention mechanism for the immersion medium forms a liquid pool structure for the immersion medium 31. Hereinafter, the retention mechanism for the immersion medium will be called a "liquid pool plate" 40.

The objective lens 10 is inserted in an opening part at the center of the bottom plate 41 of the liquid pool plate 40. Sealing is provided by an O-ring 45, to prevent the immersion medium 31 from leaking from the engagement part between the bottom plate 41 and the objective lens 10.

A hollow liquid feed tube 34 made of vinyl chloride resin is connected to the wall 42 of the liquid pool plate 40. Through inside the liquid feed tube 34, the immersion medium 31 is fed onto the objective lens 10. As shown in FIG. 4, the immersion medium 31 covers a lens ring 43 at the tip portion of the objective lens 10, and forms a dome-like mass defined by a contact angle relationship with the a portion.

As the micro-plate 20 moves, the immersion medium 31 moves along the surface of the α portion and flows down on the surface of the β portion. The immersion medium 31 is stopped by the wall 42 and retained in the liquid pool plate 40. A hollow drain tube 35 made of vinyl chloride resin is connected to the bottom of the liquid pool plate 40. Through this drain tube 35, the immersion medium 31 flowing down inside the liquid pool plate 40 is drained.

The liquid pool plate 40 has a circular outer shape, and material thereof is aluminum. Material of the wall 42 put around the liquid pool plate 40 is aluminum as well. The wall 42 is 2 mm high and 1 mm thick. Both the liquid feed tube 34 and the drain tube 35 have an outer diameter of 3 mm and an inner diameter of 2 mm. Material of the liquid pool plate is not limited to aluminum but may be, for example, metal such as iron or copper, or alternatively glass, acrylic resin, or the like. The liquid feed tube 34 and the drain tube are not limited to vinyl chloride resin but may be other resin of polyethylene or polystyrene, or may alternatively be glass tubes or pipes made of metal such as iron.

A basic concept of the retention mechanism for an immersion medium according to the present invention will be described next. FIGS. 5A and 5B are views schematically showing a contact angle between a substrate and an immersion medium.

When the affinity is high, wettability is high and the contact angle is small. When the affinity is low, the wettability is low and the contact angle is large. The present invention utilizes the affinity between material retaining the immersion medium and the immersion medium. By changing this material, the affinity is controlled so that the immersion medium can be suitably retained and drained.

Hereinafter, a detailed description will be made of retention and drainage of the immersion medium along with a specific structure thereof.

A first member (α portion) having a low affinity with the immersion medium 31 is positioned so as to surround the tip portion of the objective lens 10. More specifically, if the contact angle between the immersion medium 31 and the first member is not smaller than a predetermined angle, the immersion medium can be repelled effectively. As a result of this, the immersion medium 31 can be kept in a dome-like shape by surface tension. Even if a large amount of immersion medium 31 is supplied, the immersion medium 31 can be kept in a dome-like shape by surface tension against gravity. Then, in this state, the immersion medium 31 can be maintained stably even if observation or measurement is carried out for a long time with the immersion medium 31 made contact the bottom face of a sample container such as a micro-plate 20. Therefore, stable measurement data can be obtained.

If water is used as an immersion medium, material which repels the immersion medium 31, i.e., material having a low affinity is, for example, resin such as nylon, polyvinyl chloride, polyvinylidene chloride, polyethylene terephthalate, or polymethyl methacrylate. Preferably, the material is polyethylene terephthalate (contact angle: 75°) or polymethyl methacrylate (contact angle: 80°). More preferably, the material has a contact angle of 90° or more, and is polyethylene, polystyrene, polycarbonate, polypropylene, polyacetal, various resin such as ABS resin, various resin containing fluorine such as polytetrafluoro ethylene, polytrifluoro ethylene, or polychlorotrifluoro ethylene, or ZnO (zinc oxide) or the like. By use of these materials, the member for retaining the immersion medium near the tip portion of the objective lens can be constituted.

These materials, alkylsilane, or fluoroalkylsilane are coated to a substrate directly or indirectly, to retain the immersion medium near the tip portion of the objective lens. Further, the member for retaining the immersion medium near the tip portion of the objective lens can be constituted by composite plating by which plating is effected on a substrate while suspending particles of various resin containing fluorine such as polytetrafluoro ethylene, polytrifluoro ethylene, or polychlorotrifluoro ethylene in an electrolyte.

In order to lower the affinity and expand the contact angle in the case of using water as the immersion medium, a hydrophobic group such as alkylsilane or fluoro alkylsilane should preferably be formed on the surface of substrate.

This hydrophobic group may be -R, -RX, —SiR3, —SiRmXn, —OR, —CS, —COOCH3, —CH2OCH3, or the like. In this case, R is an alkyl group and X is halogen.

Further, in the sample container and a peripheral portion where a liquid overflowing due to contact of the immersion medium 31 is collected, the second member (β portion) is formed to have an affinity with liquid. Therefore, the immersion medium 31 tends to flow easily so that an improved drainage characteristic can be obtained. Specifically, if the affinity is improved between the second member forming the outer circumference of the first member and the immersion medium 31, the drainage characteristic can be improved. In particular, the drainage characteristic can be improved more if the contact angle is smaller than a predetermined angle.

In order to reduce the contact angle in the case of using water as the immersion medium, a hydrophilic group should preferably be formed on the surface of substrate, e.g., water glass or hydrolysate of silicon alkoxide, with or without water-soluble resin or colloidal silica added thereto, should preferably be formed on the surface of substrate in the peripheral portion where overflowing liquid is collected.

This hydrophobic group is —SO$_3$H, —SO$_3$M, —OSO$_3$H, —OSO$_3$M, —COOM, —NR$_3$HX, —COOH, —NH$_2$, —CN, —OH, —NHCONH$_2$, or —(OCH$_2$CH$_2$)$_n$—. In this case, R is an alkyl group, M is alkaline metal or —NH$_4$, and X is halogen.

Alternatively, the surface having an affinity with water may be formed by photocatalysis by coating TiO$_2$ (titanium dioxide).

Various methods are applicable as a surface treatment method capable of controlling the affinity with these immersion media. Various plating, painting, thermal spraying, fusion bonding, coating, dip coating, spin coating, spray coating, vapor deposition, sputtering, or the like may be applied.

Based on this fundamental technical idea, the retention mechanism for an immersion medium is constituted as follows, according to the first embodiment.

FIG. 6 is a cross-sectional view of a liquid pool plate. A bottom plate 41 and a lens ring 43 are formed of aluminum. Polytetrafluoro ethylene was baked to be painted on an α portion and the surface of the lens ring 43. The contact angle of this polytetrafluoro ethylene to water as the immersion medium 31 was about 110°. The lens ring 43 has an inner radius r of 18 mm, an outer diameter R of 30 mm, and an inclination angle θ of 15°.

This apparatus was supplied with water as the immersion medium 31. The observation position was moved, and the focus adjustment was carried out. The contact angle of water as the immersion medium 31 to the α portion was large, so that the immersion medium stably maintained a dome-like shape effectively between the tip portion of the objective lens 10 and the bottom face of the micro-plate 20 for a long time.

The present invention is arranged such that, even if a large amount of immersion medium 31 is supplied, filled between the tip portion of the objective lens 10 and the bottom face of the micro-plate 20, the immersion medium 31 does not easily run down along the main body of the immersion objective lens 10 due to gravity but maintains stably the immersion medium 31 at the tip portion of the immersion objective lens 10 for a long time.

To achieve this object, the α portion or an area retaining the immersion medium 31, which is constituted by the lens ring 43, has an inner diameter r of 2 to 20 mm, an outer diameter R of 10 to 40 mm, and an inclination angle θ ranging from 1 to 30 degrees, as shown in FIG. 6.

[Modification of the First Embodiment]

Figure 7:
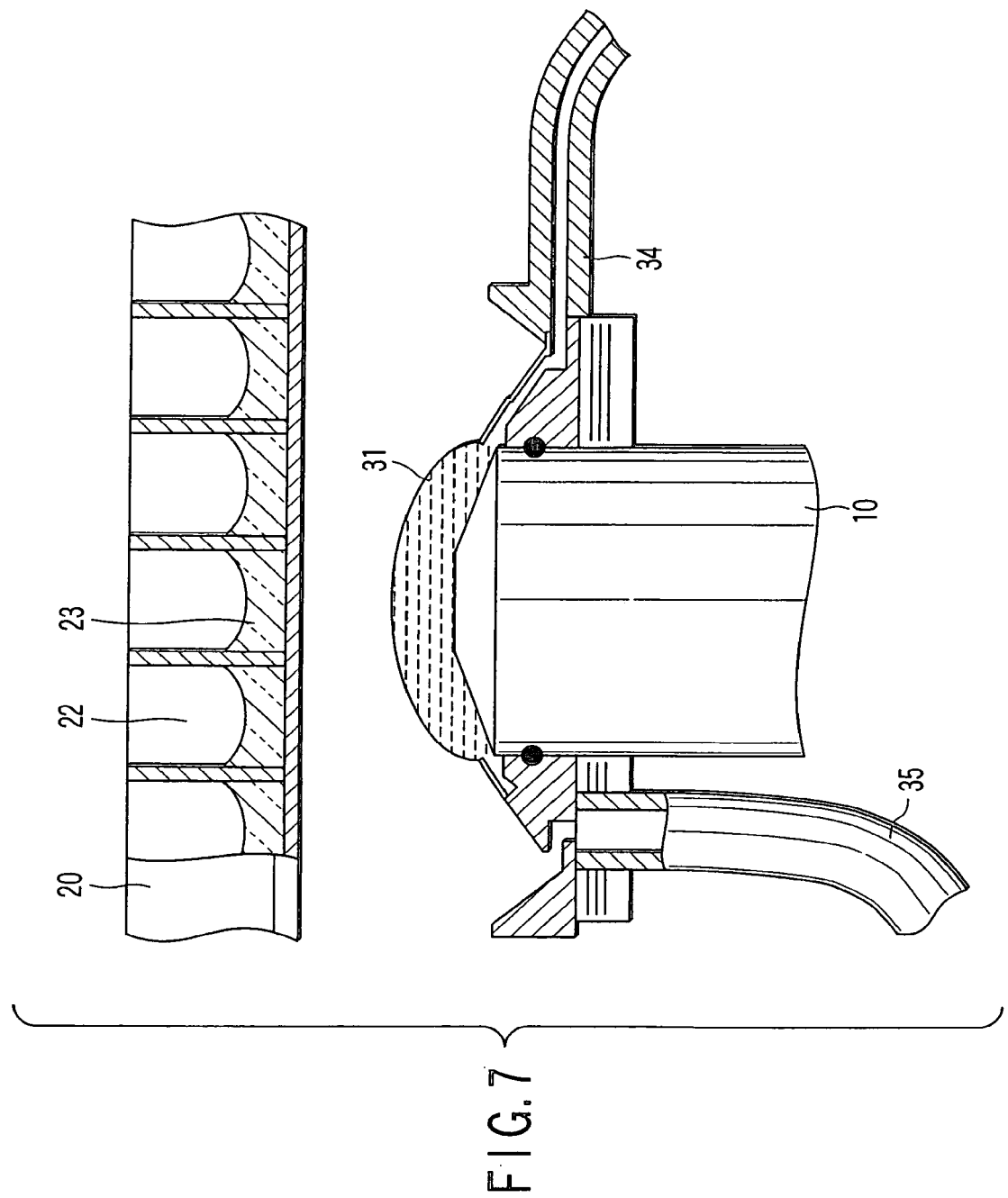
FIG. 7 is an enlarged cross-sectional view showing a tip portion of an objective lens and a part of a micro-plate.

Next, a modification of the first embodiment will be described. This modification has a different retention mechanism for an immersion medium. FIG. 7 is an enlarged view showing the tip portion of an objective lens and a part of a micro-plate.

As shown in FIG. 7, in this modification, the inner wall of a liquid pool plate 40 has a conical shape about the objective lens 10 as the center thereof. Meanwhile, the outer wall of the liquid pool plate 40 has a cylindrical shape. Even if an immersion medium fed from an automatic liquid feed/drain mechanism 24 overflows from the lens part at the center of the objective lens 10, the immersion medium can be smoothly guided into a drain tube 35 because the inner wall of the liquid pool plate 40 has a conical shape.

[Modification 2 of the First Embodiment]

Figure 8:
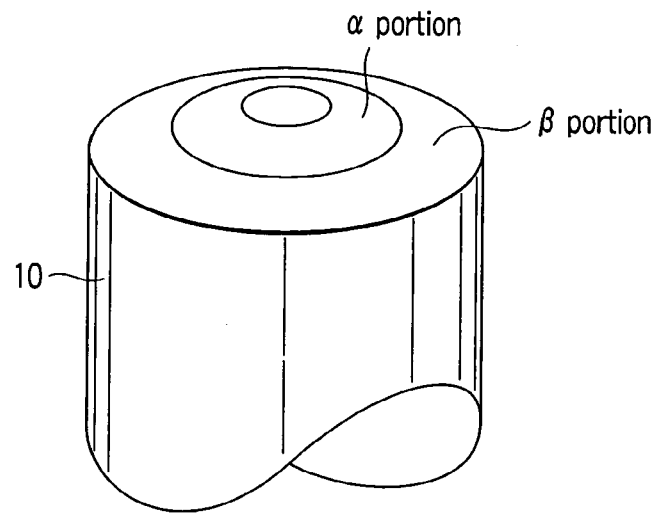
FIG. 8 is a perspective view showing a retention mechanism for an immersion medium, according to a modification of the first embodiment.

FIG. 8 is a view from upside, showing a lens ring portion retaining an immersion medium. In this modification, the lens ring portion has a separate structure consisting of an α member and a β member, as shown in FIG. 8. This enables suitable maintenance and drainage of the medium.

Figure 9:
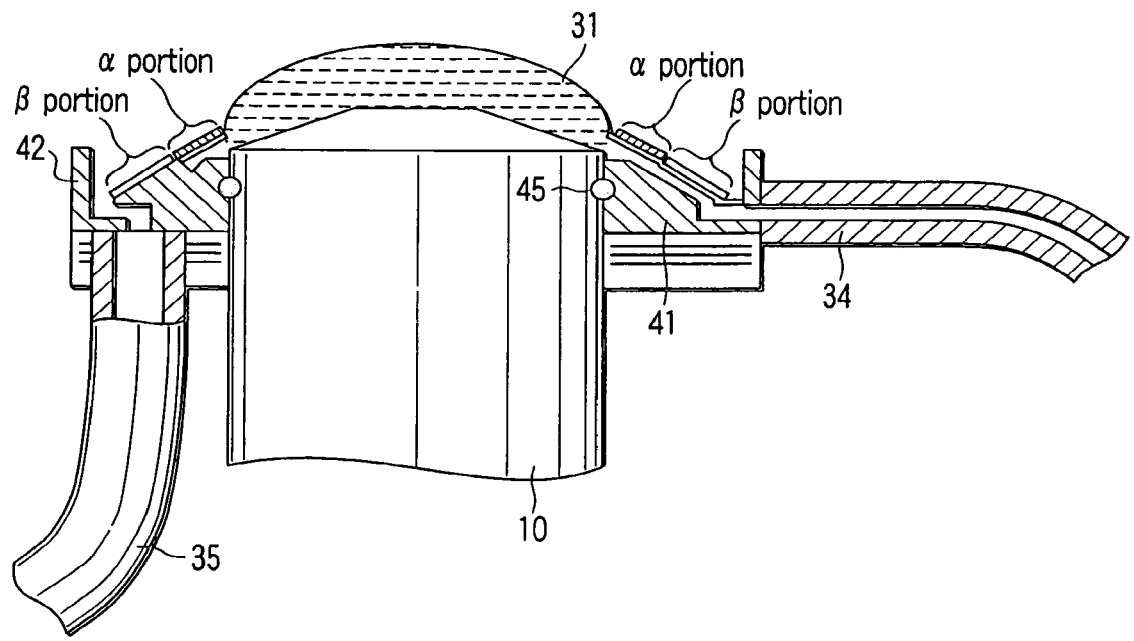
FIG. 9 is a cross-sectional view showing the retention mechanism for an immersion medium, according to the modification of the first embodiment.

In further another modification, the retention mechanism for an immersion medium is constituted by a lens ring portion, a hollow bottom plate 41 attached to be engaged around the objective lens 10, and a wall 42 put along the periphery of the bottom plate 41, as shown in FIG. 9. The lens ring portion means the whole inclined face from the lens at the tip portion of the objective lens to an outer frame of the lens. The lens ring portion is made of aluminum and has a recess in which an a member is engaged. The whole lens ring portion is subjected to an alumite treatment. Polypropylene (at a contact angle of about 90°) as material having a low affinity with water was molded into a donut-like shape, which was fitted in the recess. Alumite has a higher affinity with water than polypropylene. The immersion medium was maintained stably on the lens, and excess of the immersion medium was drained smoothly.

[Second Embodiment]

The retention mechanism for an immersion medium according to the second embodiment of the present invention has the same shape as that of the first embodiment. However, the surface treatment method for treating the α portion, β portion, and lens ring 43 is different from that of the first embodiment. Therefore, the same portions as those of the first embodiment will be denoted at the same reference symbols, and detailed descriptions thereof will be omitted herefrom.

According to the second embodiment, the α portion and the lens ring 43 were subjected to spray coating of a methanol solution containing 2% CF$_3$CF$_2$CH$_2$Si(OCH$_3$)$_3$ as a kind of fluoroalkylalkoxysilane while the β portion was masked to be not coated. Thereafter, the resultant was dried at a room temperature.

Next, the mask was removed from the β portion. With the α portion masked, a small amount of nitric acid was added to a methanol solution of trimethoxysilane, and hydrolysis occurred for an hour. Thereafter, the hydrolysis solution was spray coated on the β portion. The resultant was dried for an hour at 120° C. Before coating, the α portion before coating has an average surface roughness of 2 nm. Contact angles of the α portion and the β portion to water according to the present embodiment were measured to be about 60° and 20°, respectively.

This apparatus was supplied with water as an immersion medium 31. The observation position was moved, and the focus was adjusted. A dome of water as the immersion medium 31 was effectively formed and maintained. Water which ran down from the dome was effectively drained. Thus, it has been confirmed that the dome of water is effectively formed and retained stably and constantly if the contact angle of the immersion medium to material having a low affinity is 60°, and that water running down from the dome is effectively drained.

[Third Embodiment]

The retention mechanism for an immersion medium according to the third embodiment of the present invention has the same shape as that of the first embodiment. However, the surface treatment method for treating the α portion, β portion, and lens ring 43 is different from that of the first embodiment. Therefore, the same portions as those of the first embodiment will be denoted at the same reference symbols, and detailed descriptions thereof will be omitted herefrom.

According to the third embodiment, the α portion and the lens ring 43 were subjected to spray coating of a methanol solution containing 2% CF$_3$CF$_2$CH$_2$Si(OCH$_3$)$_3$ as a kind of fluoroalkylalkoxysilane while the β portion was masked to be not coated. Thereafter, the resultant was dried at a room temperature.

Next, the mask was removed from the β portion. With the α portion masked, a small amount of nitric acid was added to a methanol solution of trimethoxysilane, and hydrolysis occurred for an hour. Thereafter, the hydrolysis solution was spray coated on the β portion. The resultant was dried for an hour at 120° C. Before coating, the α portion before coating has average surface roughness of 14 nm. Contact angles of the α portion and the β portion to water according to the present embodiment were measured to be about 100° and 20°, respectively.

This apparatus was supplied with water as an immersion medium 31. The observation position was moved, and the focus was adjusted. A dome of water as the immersion medium 31 was effectively formed and maintained. Water which ran down from the dome was effectively drained.

[Fourth Embodiment]

Figure 10:
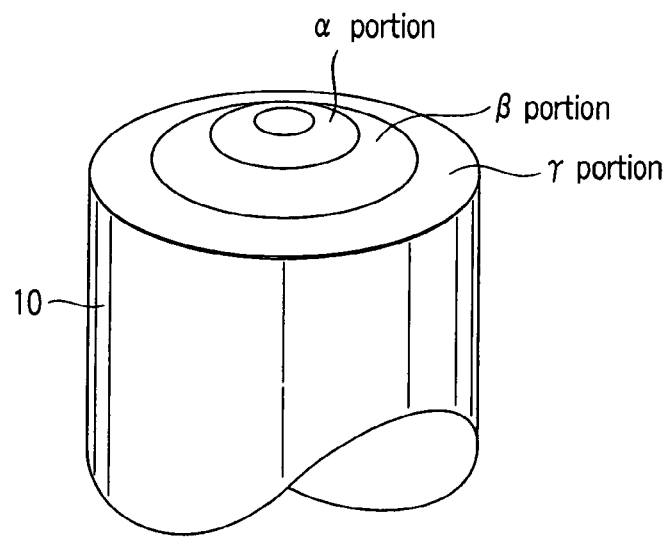
FIG. 10 is a perspective view showing a retention mechanism for an immersion medium, according to the fourth embodiment.

FIG. 10 is a view from upside, showing a lens ring portion retaining an immersion medium. In the fourth embodiment, as shown in FIG. 10, the surface of the lens ring portion is constituted by three kinds of materials, i.e., an α portion, β portion, and γ portion. The α portion is the closest portion to the center axis of the objective lens and uses material having an affinity with water. The β portion is formed like a ring around the outer circumference of the α portion, and uses material having a water repellent characteristic. The γ portion is positioned at the outermost part of the objective lens, and uses material having an affinity with water.

Alternatively, the tip portion of the retention mechanism may use one kind of member, e.g., aluminum. The surface part thereof may be applied or coated with different members, i.e., α portion, β portion, and γ portion. In this case, the α portion is applied or coated with material having an affinity with water. The β portion is applied or coated with material having a water repellent characteristic. For the γ portion, the tip portion of the retention mechanism is applied or coated with material having an affinity with water.

Further, the α portion, β portion, and γ portion contact each other tightly, constituting the tip portion of the retention mechanism for an immersion medium. The α portion, β portion, and γ portion each has a downward inclination from the center axis of the objective lens toward the periphery. By this structure, excessive immersion water is impregnated into the liquid pool plate 40.

Specifically, a $SiO_2$—$TiO_2$ film should preferably be formed as a film having an affinity with water, at the α portion and γ portion. This film is capable of maintaining the surface given an affinity with water, due to photocatalysis. Even a one-component film of titania has a surface having an affinity with water due to photocatalysis. This is because the photocatalysis may cease, in some cases, to degrade the affinity with water while illumination light is not irradiated. In contrast, a $SiO_2$—$TiO_2$ two-component film is capable of maintaining the surfaces of the α portion and γ portion given a proper affinity with water, in cooperation with the affinity of the Si—OH group to water, while light is not irradiated.

Since light is often shut out during measurement, light should preferably be irradiated to recover the affinity with water or a light source such as a lamp should preferably be provided to recover the affinity with water, after measurement.

The $SiO_2$—$TiO_2$ two-component film can be prepared, for example, by a sol-gel method. For example, this film is prepared as follows. Silicon alkoxide is diluted with alcohol, stirred, and subjected to partial hydrolysis. The resultant thereof is thereafter added with titanium alkoxide diluted with alcohol, and is further added with a small quantity of water for final hydrolysis. Further, the resultant is stirred to adjust the sol. The sol thus obtained is applied, with the β portion masked, and is then subjected to a heat treatment. A $SiO_2$—$TiO_2$ two-component film is formed at a desired portion.

Although various methods are available as the stirring method at the time of adjusting the sol, use of a planetary stirring/defoaming device is preferred. If a planetary stirring/defoaming device is used, reaction proceeds so uniformly that the partial hydrolysis can be controlled easily, in particular. Film formation can be achieved with uniform characteristics. Besides, the sol can be adjusted within a very short time period.

Next, the mask is removed from the β portion. The α portion and γ portion are masked. The β portion is spray-coated with a methanol solution containing 2% $CF_3CF_2CH_2Si(OCH_3)_3$ as a kind of fluoroalkylalkoxysilane. The resultant is dried at a room temperature.

Figure 11:
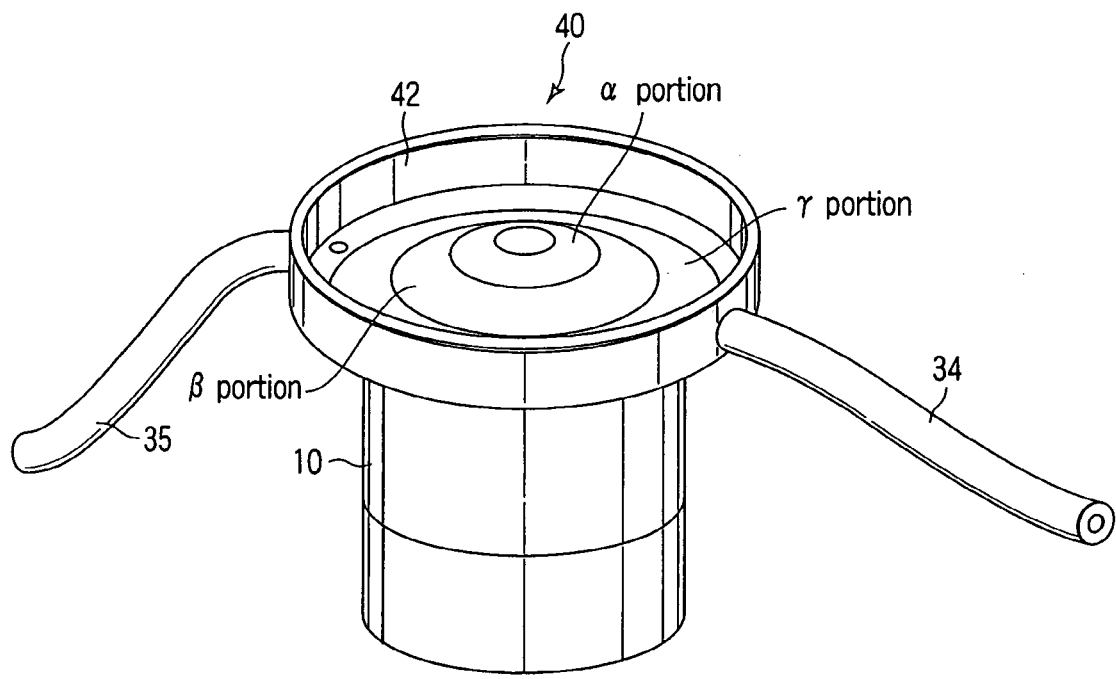
FIG. 11 is a perspective view showing another retention mechanism for an immersion medium, according to the fourth embodiment.

In another structure, as shown in FIG. 11, the α portion and β portion are provided in tight contact with each other, forming the tip portion of the retention mechanism for an immersion medium. At the part of the liquid pool plate 40, a γ portion may be applied or coated. Alternatively, the liquid pool plate 40 is subjected to a surface treatment to produce the γ portion.

By dividing the lens ring portion into separate bands, e.g., an α portion having an affinity with water, a β portion having a water repellent characteristic, and a γ portion having an affinity with water, orderly from the center. As a result of this, the liquid quantity of the immersion medium retained on the lens at the tip portion of the objective lens, and the lens ring portion in the periphery thereof is greater than those of the two band structures, i.e., the α portion and the β portion. Therefore, a much greater quantity of immersion medium can be maintained at the tip portion of the objective lens, advantageously when carrying out a microscopic observation for a long time. In addition, the immersion medium needs to be charged less frequently, so that experimenters can save labor.

The retention mechanism for an immersion medium is constituted by a hollow bottom plate attached in engagement with the periphery of the objective lens 10, and a wall put around along the periphery of the bottom plate. Alternatively, the mechanism is constituted by a lens ring portion, a hollow bottom plate attached in engagement with the periphery of the objective lens 10, and a wall put around along the periphery of the bottom plate.

The immersion medium 31 is not limited to water immersion. The object of the present invention can be achieved by the same structures in case of an oil immersion method. At this time, attention should be paid to that affinities of respective members with the immersion medium 31 in the case of using oil are opposite to those in the case of using water. For example, in the description made above, material which has a high affinity in the case of using water as the immersion medium 31 can be used as material having a low affinity in the oil immersion method. Inversely, material which has a low affinity when water is used as the immersion medium 31 can be used as material having a high affinity in the oil immersion method.

The present invention is not limited directly to the above embodiments but may be practiced with constitutional elements thereof modified without deviating from the subject matter of the invention in practical phases. Further, various inventions may be formed by appropriately combining plural constitutional elements disclosed in any of the above embodiments. For example, several constitutional elements may be removed from all constitutional elements suggested in any of the embodiments. Furthermore, constitutional elements may be combined between different embodiments.

What is claimed is:

1. A retention mechanism for an immersion medium, for use in a device which observes/measures a sample by use of an immersion objective lens, the immersion objective lens being formed of a tip portion, a lens ring portion and a lens outer frame, the lens ring portion being formed of an entire surface inclined from the lens of the tip portion to the lens outer frame, the retention mechanism comprising:

a bottom plate which has an opening portion to be engaged around the immersion objective lens;

a wall plate arranged along a periphery of the bottom plate;

an immersion medium supply unit which supplies the immersion medium to the tip portion of the immersion objective lens; and a drip draining unit of the immersion medium provided on the bottom plate in vicinity of the wall plate, which drains a drip of the immersion medium from the tip portion of the immersion objective lens, the bottom plate comprising a first ring-member formed of a first material for retaining the immersion medium and arranged to surround the opening portion, the bottom plate being inclined to make a side of the opening portion higher than a side of the wall plate, an affinity of the first ring-member with the immersion medium being lower than an affinity of an inner member of the first ring-member with the immersion medium.

2. The retention mechanism for an immersion medium, according to claim 1, further comprising a second ring-member formed of a second material for draining the immersion medium, which is arranged outside the first ring-member to surround the first ring-member, wherein the affinity of the first ring-member with the immersion medium is lower than an affinity of the second ring-member with the immersion medium.

3. The retention mechanism for an immersion medium, according to claim 2, wherein a contact angle between the first ring-member and the immersion medium is greater than 60°.

4. The retention mechanism for an immersion medium, according to claim 3, wherein the material of at least one of the first ring-member retaining the immersion medium and the second ring-member is synthetic resin.

5. The retention mechanism for an immersion medium, according to claim 1, wherein a contact angle between the first ring-member and the immersion medium is greater than 60°.

6. The retention mechanism for an immersion medium, according to claim 5, wherein the first ring-member retaining the immersion medium is formed of synthetic resin.

7. The retention mechanism for an immersion medium, according to claim 6, wherein the first ring-member is a region surface-processed with a material for retaining the immersion medium.

8. The retention mechanism for an immersion medium, according to claim 1, wherein the first ring-member retaining the immersion medium is formed of synthetic resin.

9. The retention mechanism for an immersion medium, according to claim 8, wherein the first ring-member is a region surface-processed with a material for retaining the immersion medium.

10. The retention mechanism for an immersion medium, according to claim 1, wherein the first ring-member is a region surface-processed with a material for retaining the immersion medium.

11. A method of manufacturing a retention mechanism for an immersion medium, for use in a device which observes/measures a sample by use of an immersion objective lens, the immersion objective lens being formed of a tip portion, a lens ring portion and a lens outer frame, the lens ring portion being formed of an entire surface inclined from the lens of the tip portion to the lens outer frame, the method comprising:

forming an opening portion to be engaged around the immersion objective lens, on a bottom plate;

arranging a wall plate along a periphery of the bottom plate;

providing an immersion medium supply unit which supplies the immersion medium to the tip portion of the immersion objective lens:

providing a drip draining unit of the immersion medium which drains a drip of the immersion medium from the tip portion of the immersion objective lens, on the bottom plate in vicinity of the wall plate; and arranging a first ring-member formed of a first material for retaining the immersion medium, on the bottom plate, so as to surround the opening portion, the bottom plate being inclined to make a side of the opening portion higher than a side of the wall plate, an affinity of the first ring-member with the immersion medium being lower than an affinity of an inner member of the first ring-member with the immersion medium.

12. The method according to claim 11, further comprising arranging a second ring-member formed of a second material for draining the immersion medium, which is arranged outside the first ring-member to surround the first ring-member, wherein the affinity of the first ring-member with the immersion medium is lower than an affinity of the second ring-member with the immersion medium.

13. The method according to claim 12, wherein a contact angle between the first ring-member and the immersion medium is greater than 60°.

14. The method according to claim 13, wherein the material of at least one of the first ring-member retaining the immersion medium and the second ring-member is synthetic resin.

15. The method according to claim 11, wherein a contact angle between the first ring-member and the immersion medium is greater than 60°.

16. The method according to claim 15, wherein the first ring-member retaining the immersion medium is formed of synthetic resin.

17. The method according to claim 16, wherein the first ring-member is a region surface-processed with a material for retaining the immersion medium.

18. The method according to claim 11, wherein the first ring-member retaining the immersion medium is formed of synthetic resin.

19. The method according to claim 18, wherein the first ring-member is a region surface-processed with a material for retaining the immersion medium.

20. The method according to claim 11, wherein the first ring-member is a region surface-processed with a material for retaining the immersion medium.

* * * * *